Figure 1:
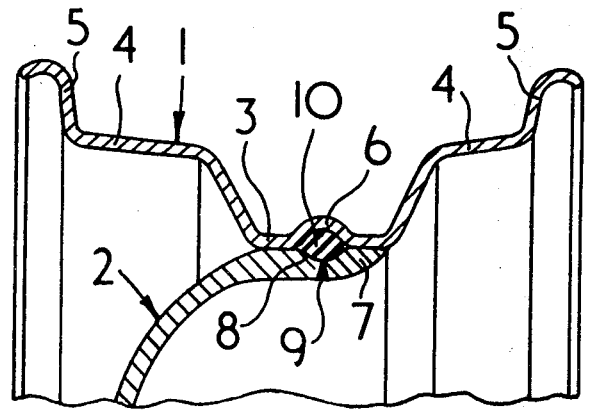

United States Patent

[11] 3,612,614

[72] Inventor Peter G. Ware
 Rugby, England
[21] Appl. No. 803,198
[22] Filed Feb. 28, 1969
[45] Patented Oct. 12, 1971
[73] Assignee Dunlop Holdings Limited
 London, England
[32] Priority Mar. 15, 1968, May 1, 1968
[33] Great Britain
[31] 12585/68 and 22771/68

[54] VEHICLE WHEELS
 24 Claims, 8 Drawing Figs.
[52] U.S. Cl. .................................................. 301/63 R,
 29/159.01, 29/159.03, 156/294
[51] Int. Cl. ...................................................... B60b 23/00

[50] Field of Search............................................ 29/159.01;
 249/56; 301/63, 65, 64; 156/293, 294; 152/47-51

[56] References Cited
 UNITED STATES PATENTS
 1,795,821 3/1931 Baldwin........................ 152/47
 3,480,964 11/1969 Siler............................. 156/294 X
 FOREIGN PATENTS
 221,089 1/1958 Australia...................... 301/63

Primary Examiner—Richard J. Johnson
Attorney—Stevens, Davis, Miller & Mosher

ABSTRACT: A vehicle wheel having at least two wheel parts secured together by an injected plastic locking member contained in an annular space formed between cooperating configurations of the two wheel parts.

PATENTED OCT 12 1971 3,612,614

SHEET 1 OF 3

INVENTOR
PETER G. WARE
By
ATTORNEYS

INVENTOR
PETER G. WARE
ATTORNEYS

VEHICLE WHEELS

This invention relates to vehicle wheels.

In a vehicle wheel of the kind comprising a one-piece tire supporting rim and a load supporting disc the disc is usually attached to the rim by means of riveted or welded joints. These methods of attachment are disadvantageous in that riveted joints often allow leakage of air from an associated tire mounted on the rim and welding is an expensive operation.

In addition in a vehicle wheel of the kind described it is necessary to provide the rim with an inwardly depressed central portion or "well" to facilitate mounting and demounting of a tire, and this depressed portion reduces the space available within the confines of the wheel for a brake.

One object of the present invention is to provide an improved method of wheel construction.

According to one aspect of the invention a method for the assembly of a vehicle wheel having a load supporting disc part and a tire supporting rim formed from at least one annular rim part, comprises securing in position at least one of the said parts by injection of a thermoplastic or thermosetting material in a liquid or plastic state into at least one circumferentially extending annular space formed between cooperating configurations of two of the said parts, then allowing the material to solidify to form a locking member in situ.

According to a further aspect of the invention there is provided a vehicle wheel assembled by a method as described in the preceding paragraph.

According to a still further aspect of the invention a method for mounting a tire on a wheel having a load supporting disc part and a tire supporting rim formed from at least two annular rim parts, said method comprises mounting the tire on one of said rim parts, assembling the wheel, and securing together at least two of the said rim parts by the injection of a thermoplastic or thermosetting material in a liquid or plastic state into at least one annular space formed between cooperating configurations of at least two of the wheel parts and allowing the material to solidify to form a locking member in situ.

Several embodiments of the invention will now be described by way of example with reference to the accompanying drawings in which:

FIGS. 1–8 are axial cross-sectional views of portions of wheels according to the invention.

In one embodiment of the invention as seen in FIG. 1 a vehicle wheel comprises a one-piece rim 1 and a cast or forged disc 2. The rim is of the conventional kind having a radially inwardly depressed central portion 3 to facilitate mounting and demounting of an associated tire, a bead-seating region 4 and a bead-retaining flange 5 at each end. Part 6 of the central portion 3 is pressed radially outwardly to define a circumferentially extending channel in the radially inner surface of the portion 3.

The peripheral portion 7 of the disc 2 is of cylindrical form and fits within and in contact with the radially inner surface of the central portion 3. A circumferentially extending channel in the form of a groove 8 is formed in the portion 7 and the disc and rim are arranged so that the channels are in confronting relationship and define a circumferentially extending annular space between the two portions 3,7.

Four small holes 9 are formed in the peripheral portion of the disc communicating with the annular space. The four holes are arranged at equally spaced positions along the circumference of the cylindrical peripheral portion 7 of the disc 2. Thermosetting or thermoplastic material in the liquid state is injected into the annular space through two diametrically opposed holes and displaced air escapes from the other two holes.

The injected material sets hard on cooling to form a ring of solid material 10 which acts both as a sealing member to prevent escape of air from an associated tire mounted on the rim (not shown) and as a locking member to resist shear forces tending to separate the rims and the disc.

Figure 2:
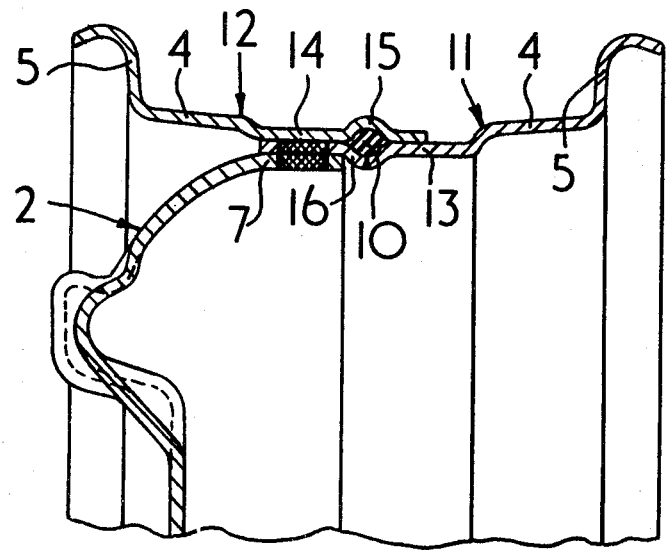

In a second embodiment of the invention as seen in FIG. 2 the rim comprises a first annular part 11 and a second annular part 12. The disc part 2 is formed in a cup shape and welded at its outer peripheral portion 7 to the radially inner peripheral surface of a circumferentially extending portion 13 of the first rim part 11 in such a manner that the substantially radial part of the disc body is on the outboard side of the wheel and the first rim part 11 is on the inboard side of the wheel. The outboard and inboard sides of the wheel referred to are the sides of the wheel that are designed to face respectively outwards and inwards to an associated vehicle body. The first rim part 11 has a stepped shape, the portion of smaller diameter 13, to which is welded the disc 2, fitting coaxially within and in contact with the radially inner surface of a circumferentially extending portion 14 of the second rim part 12. Both rim parts are shaped at their axially outer peripheral portions, with respect to the central radial plane of the wheel, to give conventional bead-seating regions 4 and rim flanges 5. Part 15 of the portion 14 of the second rim part 12 is pressed radially outwardly and part 16 of the portion 13 of the first rim part 11 is pressed radially inwardly so that confronting circumferential channels are formed in the portions 13,14 of the rim parts 11,12, these channels defining an annular space between the two portions 13,14.

A tire (not shown) is mounted in position on one rim part prior to assembly of the wheel. The wheel is then assembled and the rim parts are locked together, holding the tire in position, by injection of a thermosetting or thermoplastic material into the annular space between the rim parts to provide an annular locking and sealing member 10.

In the event that it is considered desirable to separate the rim components at some stage after assembly and use of the wheel the locking and sealing member 10 is formed from a thermoplastic material. Local heating of the member 10 by electrical induction or other means will then enable the rim components to be drawn apart by suitable mechanical or hydraulic means.

Additional mechanical strength can be given to the ring of injected material by introducing one or more strands of wire or metal ribbon into the annular space prior to injecting the material. The ends of the strands may be exposed so that the strands can be withdrawn to allow separation of the rim components, in the case where the material is a thermoplastic material, after heating the rim so as to soften the thermoplastic material.

Figure 3:
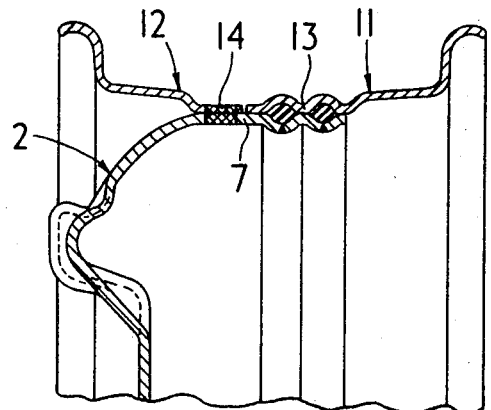

In a third embodiment of the invention as seen in FIG. 3 the two rim parts 11, 12 are of similar diameter, the peripheral portion 7 of the disc 2 is welded to a circumferentially extending portion 14 of the outboard rim part 12 and a circumferentially extending portion 13 of the inboard rim part 11 is locked to the disc by thermoplastic or thermosetting locking members 10 within two adjacent annular spaces formed between the peripheral portion 7 of the disc 2 and the portion 13 of the inboard rim part 12.

Figure 4:
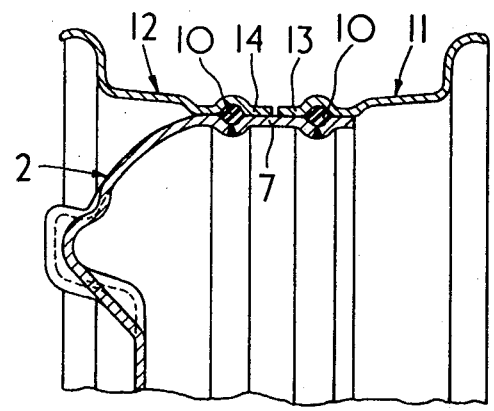

In a fourth embodiment of the invention as seen in FIG. 4 the two rim parts 11,12 are of similar diameter and they are both locked to the peripheral portion 7 of the disc 2 by means of thermosetting or thermoplastic locking members 10 within annular spaces formed between the peripheral portion 7 of the disc and circumferentially extending portions 13,14 of the rim parts 11,12. A vehicle wheel according to this embodiment may be assembled without need for welding at any stage.

Figure 5:
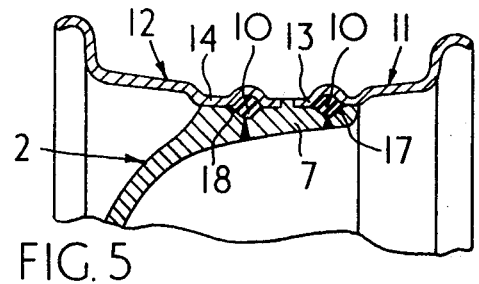

In a modification of this embodiment as seen in FIG. 5 the disc 2 is cast or forged and the peripheral portion 7 of the disc 2 is formed with circumferentially extending grooves 17,18 which provide the channels in the disc portion 7.

Figure 6:
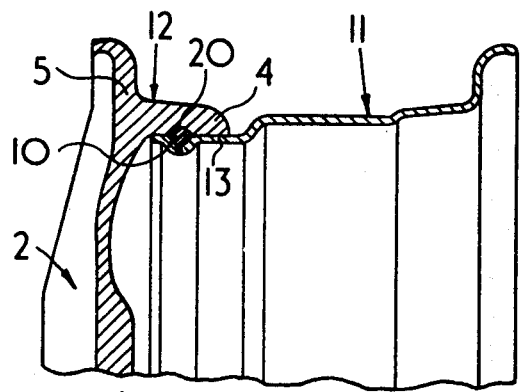

In a fifth embodiment of the invention as seen in FIG. 6 a light alloy cast disc 2 is shaped at its peripheral portion effectively to give a first or outboard rim part comprising a rim flange 5 and bead-seating region 4 integral with the disc 2. The inboard rim part 11 has on its outboard side a circumferentially extending peripheral portion 13 of smaller diameter which fits coaxially within and is locked to the bead-seating portion 4 of the outboard rim part 12 by means of a locking member 10 within an annular space formed by a circumferentially extending groove 20 in the outboard bead-seating portion 4 and a confronting channel in the outboard peripheral portion 13 of the inboard rim part 11. This embodiment has the advantage that the disc body is integral with the outboard rim flange, obviating the need for rim embellishments which are often provided for stylistic reasons on wheels which have the disc attached to the central portion of the rim. In addition, the bead-seating region, since it is an integral part of the disc, may be provided with a passage connecting the air chamber of an associated tire with an inflation valve mounted in the disc (not shown).

Figure 7:
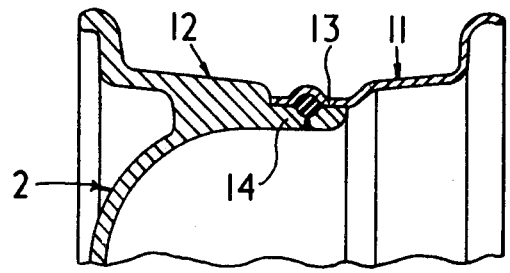

In a modified form, as seen in FIG. 7, the embodiment described in the preceding paragraph comprises a light alloy cast disc 2 shaped at its peripheral portion effectively to give a first or outboard rim part 12 integral with the disc and having a stepped shape, the portion 14 of smaller diameter fitting coaxially within and being locked, by means of a thermosetting or thermoplastic locking member 10 within an annular space formed between the rim parts, to the outboard peripheral portion 13 of the inboard rim part.

Figure 8:
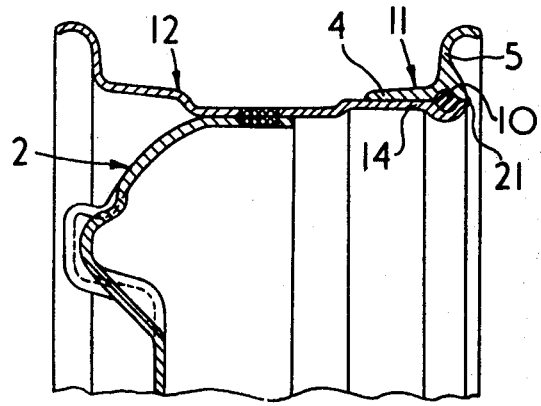

In a sixth embodiment of the invention as seen in FIG. 8 the outboard rim part 12 extends across the whole width of the rim and the inboard rim part 11 consists only of the inboard bead-seating region 4 and flange 5 of the wheel, the inboard rim part 11 fitting coaxially around the inboard peripheral portion 14 of the outboard rim part 12 and an annular space for the locking member 10 being formed between the two parts 11,12. The annular space is close to the inboard face of the wheel rim and only two holes arranged at diametrically opposed positions are provided for injection of the material into the space, displaced air escaping between the inboard rim flange 5 and the outboard rim part 12. Material injected into the annular space also exudes between the inboard rim flange 5 and the rim part 12 giving a ring 21 of the injected material on the inboard rim face at the base of the inboard flange 5. This ring 21 is pressed flat before hardening to give a surface on which may be impressed, for example, relevant wheel data.

In the vehicle wheels described above the final assembly step involves injection of the thermosetting or thermoplastic material into one or more annular spaces, any step involving welding having been completed in an earlier stage in the assembly of the wheel. Consequently a tire may be mounted in position on the rim before final assembly of the wheel takes place. This obviates the need for a well in the rim to facilitate mounting of the tire and thus more space is available within the confines of the wheel for a brake.

In the vehicle wheels described above two or more wheel parts are secured together against axial displacement by the injection of a thermosetting or thermoplastic material into one or more annular spaces formed between the wheel parts. Preferably, means is also provided to ensure that relative circumferential displacement of the wheel parts does not take place under the influence of circumferential forces, for example, braking torque in the case where the wheel is intended for use with an associated brake, while permitting axial displacement of the wheel parts during assembly of the wheel. Any suitable means may be employed for preventing relative circumferential movement of the wheel parts, for example interlocking projections and depressions may be formed on the wheel parts, or the wheel parts may be shaped to provide axially extending spaces communicating with the annular spaces into which the injected material can flow to form, on solidifying, limb portions extending axially from the locking members.

Having now described my invention, what I claim is:

1. A vehicle wheel comprising a load supporting disc part and a rim adapted to support a pneumatic tire formed from at least one annular rim part, at least two of the said parts being interlocking secured together in abutting contact against axial separation solely by means of a nonresilient locking member formed from injection moulded thermoplastic material contained in a circumferentially extending annular space formed between cooperating channel configurations of the said two parts.

2. A vehicle wheel according to claim 1 wherein the rim is formed from one annular rim part.

3. A vehicle wheel according to claim 2 wherein a circumferentially extending portion of the disc part fits within and in contact with the radially inner surface of a circumferentially extending portion of the rim, the disc part and the rim part being secured together by means of said locking member.

4. A vehicle wheel according to claim 3 wherein the rim has a radially inwardly depressed central portion or well which constitutes the said circumferentially extending portion of the rim.

5. A vehicle wheel according to claim 3 wherein the annular space between the two portions is formed by confronting circumferentially extending channels formed respectively in the two portions.

6. A vehicle wheel according to claim 5 wherein the channels are formed in the said two portions by deformation of the said two portions in a radial direction.

7. A vehicle wheel according to claim 5 wherein the disc part is cast or forged and formed with a circumferentially extending groove in its said circumferentially extending portion to provide the channel in the said portion.

8. A vehicle wheel according to claim 1 wherein the rim is formed from two annular rim parts.

9. A vehicle wheel according to claim 8 wherein a circumferentially extending portion of the disc part fits within and in contact with the radially inner surfaces of circumferentially extending portions of the two rim parts, the disc part and at least one of the rim parts being secured together by means of said locking member contained in a circumferentially extending annular space formed between cooperating configurations of the said portions of the disc part and the said portion of the rim part.

10. A vehicle wheel according to claim 9 wherein each rim part is secured to the disc part by means of a locking member contained in a circumferentially extending annular space formed between cooperating configurations of the said portion of the disc part and the said portion of the rim part.

11. A vehicle wheel according to claim 9 wherein one only of the rim parts is secured to the disc part by means of said locking member contained in a circumferentially extending annular space formed between cooperating configurations of the said portions of the disc part and the said portion of the rim part.

12. A vehicle wheel according to claim 11 wherein the other rim part is welded to the disc part.

13. A vehicle wheel according to claim 11 wherein the other rim part is formed integrally with the disc part.

14. A vehicle wheel according to claim 8 wherein a circumferentially extending portion of one of the rim parts fits within and in contact with the radially inner surface of a circumferentially extending portion of the other rim part and the two rim parts are secured together by means of a locking member contained in a circumferentially extending annular space formed between cooperating configurations of the two portions.

15. A vehicle wheel according to claim 14 wherein the said other rim part constitutes the bead-seating region and flange at one end of the wheel.

16. A vehicle wheel according to claim 14 wherein the disc part is welded at its peripheral portion to one of the rim parts.

17. A vehicle wheel according to claim 16 wherein the disc part is formed integrally with one of the rim parts.

18. A vehicle wheel according to claim 1 wherein at least one strand of wire is embedded in the said material.

19. A vehicle wheel according to claim 18 wherein one end of the said strand is exposed so that the strand can be withdrawn after softening the thermoplastic material by heating.

20. A vehicle wheel according to claim 1 wherein at least one metallic ribbon is embedded in the said material.

21. A vehicle wheel according to claim 20 wherein one end of the ribbon is exposed so that the ribbon can be withdrawn after softening the thermoplastic material by heating.

22. A vehicle wheel according to claim 1 wherein locking means is provided to prevent relative circumferential displacement of the two parts.

23. A vehicle wheel according to claim 22 wherein the locking means comprises at least one limb portion extending from the locking member which engages a recess defined by at least one of the said two parts.

24. A vehicle wheel according to claim 22 wherein at least one of the two parts is provided with a roughened surface engaging the other part to provide the said locking means.